United States Patent
Takaoka

(10) Patent No.: US 10,233,073 B2
(45) Date of Patent: Mar. 19, 2019

(54) THREE-DIMENSIONAL STRIPED STRUCTURE

(71) Applicant: C-ENG CO., LTD., Gamagori-shi, Aichi (JP)

(72) Inventor: Nobuyuki Takaoka, Gamagori (JP)

(73) Assignee: C-ENG CO., LTD., Gamagori-shi, Aichi (JP)

( * ) Notice: Subject to any disclaimer, the term of this patent is extended or adjusted under 35 U.S.C. 154(b) by 0 days.

(21) Appl. No.: 15/573,488

(22) PCT Filed: May 27, 2016

(86) PCT No.: PCT/JP2016/002565
§ 371 (c)(1),
(2) Date: Nov. 13, 2017

(87) PCT Pub. No.: WO2016/189879
PCT Pub. Date: Dec. 1, 2016

(65) Prior Publication Data
US 2018/0086623 A1   Mar. 29, 2018

(30) Foreign Application Priority Data

May 28, 2015 (JP) ................................. 2015-108450

(51) Int. Cl.
| | |
|---|---|
| *B68G 5/00* | (2006.01) |
| *A47C 16/00* | (2006.01) |
| *A47G 9/10* | (2006.01) |
| *A47C 27/12* | (2006.01) |
| *B29C 47/30* | (2006.01) |
| *D04H 3/03* | (2012.01) |
| *B33Y 80/00* | (2015.01) |
| *D04H 3/16* | (2006.01) |
| *B29C 47/00* | (2006.01) |
| *B29C 47/88* | (2006.01) |
| *B29C 71/02* | (2006.01) |
| *B29K 23/00* | (2006.01) |
| *B29K 105/00* | (2006.01) |
| *B29D 99/00* | (2010.01) |

(52) U.S. Cl.
CPC ............... *B68G 5/00* (2013.01); *A47C 16/00* (2013.01); *A47C 27/12* (2013.01); *A47C 27/121* (2013.01); *A47G 9/10* (2013.01); *B29C 47/30* (2013.01); *B33Y 80/00* (2014.12); *D04H 3/03* (2013.01); *D04H 3/16* (2013.01); *B29C 47/0014* (2013.01); *B29C 47/8895* (2013.01); *B29C 71/02* (2013.01); *B29C 2071/022* (2013.01); *B29D 99/0092* (2013.01); *B29K 2023/08* (2013.01); *B29K 2105/0014* (2013.01); *B29K 2105/0085* (2013.01)

(58) Field of Classification Search
CPC ... B68G 5/00; D04H 3/16; D04H 3/03; B33Y 80/00; A47G 9/10; A47C 27/121; A47C 16/00; A47C 27/12; B29C 47/30; B29C 71/02; B29C 47/0014; B29C 47/8895; B29C 2071/022; B29K 2023/08; B29K 2105/0014; B29K 2105/0085; B29D 99/0092
See application file for complete search history.

(56) References Cited

U.S. PATENT DOCUMENTS

2003/0092335 A1* 5/2003 Takaoka .................. B29C 43/02
428/292.1

FOREIGN PATENT DOCUMENTS

| EP | 1832675 A1 | 9/2007 |
|---|---|---|
| EP | 2772576 A1 | 9/2014 |
| EP | 2966206 A1 | 1/2016 |
| EP | 3064627 A1 | 9/2016 |
| EP | 3108770 A1 | 12/2016 |
| JP | 2001-328153 A | 11/2001 |
| JP | 2015-67935 A | 4/2015 |
| WO | 2015/050134 A1 | 4/2015 |
| WO | 2015/064523 A1 | 5/2015 |
| WO | 2015/125497 A1 | 8/2015 |

* cited by examiner

*Primary Examiner* — David Sample
*Assistant Examiner* — Donald M Flores, Jr.
(74) *Attorney, Agent, or Firm* — Matthias Scholl, PC; Matthias Scholl

(57) ABSTRACT

A three-dimensional striped structure is provided which is formed by bonding continuous filaments in random in loops, has a longitudinal direction corresponding to an extruding direction, a lateral direction and a thickness direction perpendicular to the extruding direction, and is comprised of a polyethylene thermoplastic resin, a polyester thermoplastic elastomer or a mixture of a polyethylene thermoplastic resin and a polyethylene thermoplastic elastomer. The three dimensional striped structure has an impact resilience of not lower than 13 cm, a hysteresis loss of not higher than 34% and not lower than 13%, and a thermal expansion rate of 0 to 8% in the longitudinal direction before and after a hot-air drying test, and does not shrink during high-temperature sterilization.

11 Claims, No Drawings

THREE-DIMENSIONAL STRIPED STRUCTURE

TECHNICAL FIELD

The present invention relates to a three-dimensional striped structure that is used for, for example, mattresses and cushions.

BACKGROUND ART

Various techniques have been proposed for a three-dimensional net-like structure formed by conventional extrusion molding to have filaments partly tangled in loops and a two-surface or four-surface molding method of the three-dimensional net-like structure. One example is described in Patent Literature 1 in order to mold a three-dimensional net-like structure. A proposed method of molding a three-dimensional net-like structure presses down molten filaments made of or mainly made of a thermoplastic synthetic resin from a die equipped with a nozzle having a plurality of holes at an edge, makes the molten filament free fall between haul-off machines that are partly submerged in water, and hauls off the filaments at a lower speed than the falling speed, so as to manufacture a three-dimensional net-like structure. The haul-off machines are arranged to face each other to form a specified shape (for example, quadrilateral) in a direction perpendicular to the extrusion direction. The interval between the haul-off machines facing each other is set to be narrower than the width of an assembly of extruded filaments. Two surfaces or four surfaces of the outer periphery of the filament assembly are brought in contact with the haul-off machines downstream and upstream of the location where the haul-off machines are submerged in water.

CITATION LIST

Patent Literature

Patent Literature 1: JP 2001-328153A

SUMMARY OF INVENTION

Technical Problem

The prior art three-dimensional net-like structure having air permeability has loops formed at random and is shrunk by application of heat. For example, in an application for a mattress, the cover is likely to be wrinkled due to shrinkage of the three-dimensional net-like structure caused by repeated high-temperature sterilization. This makes the user feel uncomfortable and may cause bedsore by long-term use. Especially shrinkage of the three-dimensional net-like structure in the longitudinal direction has significant effect and high likelihood of wrinkles.

Additionally, the prior art three-dimensional net-like structure is unlikely to exert the functions according to the characteristics of the human body. For example, in an application of a mattress, the human body has the natural adjustment function of performing posture control during sleep, stretching and changing the body position, relaxing the muscles and the body to equalize the load of the body and reset the body stress. The proposed three-dimensional net-like structure, however, has insufficient structural characteristics following the natural adjustment function. There are a diversity of needs for products using the three-dimensional net-like structure and needs for high quality of products. This causes a difficulty in satisfying both the diversity of needs to be fit for the characteristics of the human body and the needs for the high quality of products.

An object of the invention is to provide a configuration that is thermally expandable in a longitudinal direction, enables high-temperature washing, and additionally has a hysteresis loss and an elastic property fit for the characteristics of the human body, thus satisfying a diversity of needs for the quality.

According to an aspect of the invention, there is provided a three-dimensional striped structure that is formed by bonding continuous filaments partly at random in loops, is configured to have a longitudinal direction corresponding to an extrusion direction, a lateral direction and a thickness direction perpendicular to the extrusion direction and is comprised of a polyethylene thermoplastic resin, a polyester thermoplastic elastomer or a mixture of a polyethylene thermoplastic resin and a polyethylene thermoplastic elastomer. The three-dimensional striped structure may be configured to have an impact resilience of not lower than 13 cm and a hysteresis loss of not higher than 34% and not lower than 13%. The three-dimensional striped structure may be configured to have a thermal expansion rate of 0 to 8% in the longitudinal direction before and after a hot-air drying test that is performed at a temperature of 90° C. for 30 minutes with regard to the polyethylene thermoplastic resin, that is performed at a temperature of 130° C. for 30 minutes with regard to the polyester thermoplastic elastomer and that is performed at a temperature of 90° C. for 30 minutes with regard to the mixture of the polyethylene thermoplastic resin and the polyethylene thermoplastic elastomer.

The three-dimensional striped structure preferably has a thermal expansion rate of 0 to 8% in the lateral direction before and after the hot-air drying test that is performed at the temperature of 90° C. for 30 minutes with regard to the polyethylene thermoplastic resin, that is performed at the temperature of 130° C. for 30 minutes with regard to the polyester thermoplastic elastomer and that is performed at a temperature of 90° C. for 30 minutes with regard to the mixture of the polyethylene thermoplastic resin and the polyethylene thermoplastic elastomer.

It is preferable that the three-dimensional striped structure has an anisotropic thermal expansion characteristic providing different thermal expansion rates in the longitudinal direction and in the lateral direction.

It is preferable that the three-dimensional striped structure has an impact resilience change rate of not higher than 25% after a repeated load test with regard to polyethylene thermoplastic resin and an impact resilience change rate of not higher than 20% after a repeated load test with regard to polyester thermoplastic elastomer.

It is preferable that the three-dimensional striped structure has an apparent density of 0.025 g/cm$^3$ to 0.2 g/cm$^3$, a thickness of 5 mm to 500 mm in each layer and a filament diameter of 0.1 mm to 1.5 mm.

It is preferable that the polyethylene thermoplastic resin is either polyethylene or an ethylene/α-olefin copolymer resin that is mainly made of ethylene and an α-olefin containing 3 or more carbon atoms.

It is preferable that the mixture of the polyethylene thermoplastic resin and the polyethylene thermoplastic elastomer is a mixture of an ethylene/α-olefin copolymer resin, which is mainly made of ethylene and an α-olefin containing 3 or more carbon atoms, and the polyethylene thermoplastic elastomer, and a content of the polyethylene thermoplastic elastomer in the mixture is not higher than 45% in weight ratio.

It is preferable that the three-dimensional striped structure is used for cushions, cushion seats, Japanese floor cushions, pillows, nursing care products, or cushions or mattress for beds.

It is preferable that the three-dimensional striped structure has a plurality of surfaces, among which two surface, three surfaces or four surfaces are molded, and is molded to have a curved shape or profiled shape as appropriate. It is preferable that the three-dimensional striped structure has a multi-layer structure of a three-dimensional net-like structure made of polyethylene thermoplastic resin and a three-dimensional net-like structure made of polyethylene thermoplastic elastomer.

Advantageous Effects of Invention

The three-dimensional striped structure according to the invention has the low hysteresis loss, the softness and high repulsion characteristic and thereby provide the elastic property fit for the characteristics of the human body. This accordingly meets a diversity of needs for the elastic properties of products and needs for the high quality of products, which provides the three-dimensional striped structure suitable for a cushion material or a skin material for nursing care products, beddings, furniture or vehicle seats. For example, in an application of mattresses for medical or nursing care purposes, suitable elastic properties of the three-dimensional striped structure are provided and the natural adjustment function of the human body during sleep is satisfied. This adequately addresses bedsores and enables patients to easily rise from beds. Further, it makes easier for caregivers to change body positions of patients with the aid of the repulsive forces of the mattresses.

Additionally, in an application of mattresses, the thermal expansion characteristic in the longitudinal direction and in the lateral direction suppress shrinkage of the mattresses and wrinkles of the cover even in the case of high-temperature sterilization, as well as bedsore due to the wrinkles. This makes heat sterilization of the three-dimensional striped structure easier and dry of the three-dimensional striped structure simpler and thus addresses hospital infection, which provides for the three-dimensional striped structure suitable for a cushion material that is required in medial or nursing care fields. The anisotropic thermal expansion characteristic having different thermal expansion rates in the longitudinal direction and in the lateral direction enables the three-dimensional striped structure to be fit for its application and the characteristics of the human body in the application. Two surfaces, three surfaces or four surfaces molding or molding to have a profiled shape is feasible. This enables expansion of application as medical assistive device.

DESCRIPTION OF EMBODIMENTS

The following describes embodiments of the three-dimensional striped structure (hereinafter referred to as the structure). The structure is formed by tangling a plurality of filaments at random in loops and thermally welding the tangles. The three-dimensional striped structure is a three-dimensional net-like structure with a striped sparse-dense configuration having sparse portions of a lower bulk density and dense portions of a higher bulk density arranged alternately in an extruding direction during manufacture.

Various aspects of the structure are envisaged. The structure may have any configuration, for example, a structure having harder edges, a structure including a surface layer and a rear face layer having different thicknesses, a structure including a surface and a rear face having different softness levels, and an internally pierced structure. The hardness may be changed depending on intention of use.

The structure of the invention preferably has hysteresis losses of not higher than 34%. The lower hysteresis loss means the higher return force provided at the earlier time after a release. The hysteresis loss of equal to or lower than 34% ensures the high restoring force and preferably provides the softness and the high resilience which the invention aims for. The hysteresis loss of higher than 34% undesirably leads to the delayed and low elastic repulsive force. The hysteresis loss is more preferably 15 to 34% and is furthermore preferably 20% to 34%.

The apparent density of the structure of the invention is an important factor to provide the softness and the high resilience and is designed as appropriate. The apparent density is preferably 0.025 g/cm$^3$ to 0.2 g/cm$^3$ and is more preferably 0.04 g/cm$^3$ to 0.09 g/cm$^3$. The apparent density of lower than 0.025 g/cm$^3$ does not maintain the shape, while the apparent density of higher than 0.20 g/cm$^3$ is unsuitable for mattress. The structure has stripe sparse and dense portions arranged alternately in an extruding direction. It is preferable that the ratio of the number of bonding points of the dense portion to that of the sparse portion per unit weight is 0.96 to 1.33, and the apparent density of the dense portion is larger than the apparent density of the sparse portion by not less than 0.005 g/cm$^3$. The number of bonding points per unit weight was measured using a sample which was obtained by cutting the structure into a piece having a rectangular shape with a width of 2 cm in a direction perpendicular to the extruding direction so that the piece includes two dense portions and two sparse portions in the extruding direction. After the height of the piece was measured at four corners, the volume (cm$^3$) was obtained and divided by the weight of the sample (g) to obtain an apparent density (g/cm$^3$). The number of bonding points was counted for the piece and divided by the volume of the piece to calculate the number of bonding points per unit volume (number/cm$^3$). The number of bonding points per unit volume was divided by the apparent density to calculate the bonding points per unit weight (number/g). A bonding portion between two filaments was assumed as the bonding point and the number of bonding points was counted by a method that pulls and separates the bonding portion into one string of filament. The number of bonding points per unit weight was an average value of n=2.

The structure of the invention are three-dimensional spring structures formed by welding randomly looped continuous filaments in the molten state, which have filament diameter (diameter) of 0.3 mm to 1.5 mm and are made of a thermoplastic resin, a thermoplastic elastomer or a mixture of a thermoplastic resin and a thermoplastic elastomer. The filaments may be in irregular shape or in hollow shape. The filament diameter is, however, an important factor to provide the soft touch. The excessively small filament diameter does not maintain the hardness required for the cushioning properties, while the excessively large filament diameter provides the too much hardness. The filament diameter is thus to be set in an adequate range.

Preferably, the loops have loop lengths of 5 to 50 mm or especially 8 to 15 mm. The loops on the surface may be laid down to have a surface layer of high bulk density or the surface layer of high bulk density may not be provided according to the purpose.

The thicknesses of the structure are significantly related to the softness and the high resilience and are preferably 5 mm to 500 mm, more preferably 10 to 150 mm and furthermore preferably 30 to 110 mm. The thickness of less than 5 mm undesirably leads to the low resilience, while the thickness of greater than 500 mm undesirably leads to the excessively high resilience.

In the case of mattress, cushion or the like, the dimensions of the structure may be, for example, 600 to 2000 mm in width, 1300 to 2500 mm in length and 30 to 120 mm in height. In the case of pillow, the dimensions of the structure may be, for example, 250 to 500 mm in width, 300 to 800 mm in length and 40 to 120 mm in height. The single structure may be used alone or the structures may be combined or multilayered on a skin material. The above values are shown for illustrative purposes and not limitative.

A preferable material of the structure is a polyethylene thermoplastic resin, a polyester thermoplastic elastomer or a mixture of a polyethylene thermoplastic resin and a polyethylene thermoplastic elastomer.

In the structure of the invention, the thermal expansion rate of the polyethylene thermoplastic resin in the longitudinal direction and in the lateral direction before and after a hot-air drying test at 90° C. is not lower than 0% and not higher lower than 8% and is preferably not higher than 3%. The thermal expansion rate of higher than 8% before and after a hot-air drying test at 90° C. undesirably causes a difficulty in placing the structure in the cover. The thermal expansion rate of lower than 0% before and after the hot-air drying test at 90° C. undesirably causes shrinkage of the product during high temperature sterilization and makes the cover creased.

In the structure of the invention, the thermal expansion rate of the polyester thermoplastic elastomer in the longitudinal direction and in the lateral direction before and after a hot-air drying test at 130° C. is not lower than 0% and not higher than 8% and is preferably not higher than 3%. The thermal expansion rate of higher than 8% before and after a hot-air drying test at 130° C. undesirably causes a difficulty in placing the structure in the cover. The thermal expansion rate of lower than 0% before and after the hot-air drying test at 130° C. undesirably causes shrinkage of the product during high temperature sterilization and makes the cover creased.

In the structure of the invention, the thermal expansion rate of the mixture of the polyethylene thermoplastic resin and the polyethylene thermoplastic elastomer in the longitudinal direction and in the lateral direction before and after a hot-air drying test at 90° C. is not lower than 0% and not higher lower than 8% and is preferably not higher than 3%. The thermal expansion rate of higher than 8% before and after a hot-air drying test at 90° C. undesirably causes a difficulty in placing the structure in the cover. The thermal expansion rate of lower than 0% before and after the hot-air drying test at 90° C. undesirably causes shrinkage of the product during high temperature sterilization and makes the cover creased.

In the case where the structure of the invention is used for the cushion material, the resin used, the filament diameter, the loop diameter, the surface layer, the bulk density and the shape should be adequately selected according to the purpose of use and the location used. For example, an adequate material is selected based on the preference of hardness in a country. In the where is the structure is used for a layer, the bulk density should differ between a surface layer and an intermediate layer. The structure may be molded with a die to a configuration suitable for the purpose of use to such an extent that does not damage the three-dimensional configuration and used for car seat, airplane seat, boat seat, chair and furniture. In order to satisfy required performances, a plurality of the structure made from same or different materials may be layered, and the structure may be used in combination with a hard cotton cushion material, polyurethane or non-woven fabric. The material may be treated to have fire retardancy, non-flammability, antibiotic property and color. A single or double layered removable cover that is made from a material suitable for achieving, for example, air permeability or waterproof performance may be designed as appropriate.

The polyethylene thermoplastic resin used for the structure of the invention is preferably a low-density polyethylene resin having the bulk density of not higher than 0.94 g/cm$^3$ and is more preferably an ethylene/α-olefin copolymer resin of ethylene and a three or more carbon atom-containing α-olefin. Using the material having the bulk density of higher than 0.94 g/cm$^3$ undesirably provides the hard cushion material. The bulk density is more preferably not higher than 0.935 g/cm$^3$ and is furthermore preferably not higher than 0.91 g/cm$^3$. The lower limit of the bulk density is preferably not lower than 0.8 g/cm$^3$ and is more preferably not lower than 0.85 g/cm$^3$ in terms of maintaining the strength.

The ethylene/α-olefin copolymer resin is preferably a copolymer of ethylene and a three or more carbon atom-containing α-olefin described in JP H06-293813A. Examples of the three or more carbon atom-containing α-olefin include propylene, 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pendadecene, 1-hexadecene, 1-heptadecene, 1-octadecene, 1-nonadecene and 1-eicosene. Preferable are 1-butene, 1-pentene, 1-hexene, 4-methyl-1-pentene, 1-heptene, 1-octene, 1-nonene, 1-decene, 1-undecene, 1-dodecene, 1-tridecene, 1-tetradecene, 1-pendadecene, 1-hexadecene, 1-heptadecene, 1-octadecene, 1-nonadecene and 1-eicosene. Two or more of these α-olefins may be used. The content of the α-olefin in the copolymer is generally 1 to 40% by weight.

This copolymer may be obtained by copolymerizing ethylene with an α-olefin using a catalyst system including a specific metallocene compound and an organometallic compound as the base configuration.

The polyester elastomer included in the structure of the invention is preferably a thermoplastic polyester elastomer block copolymer (A) including a high melting-point crystalline polymer segment (a) mainly made of a crystalline aromatic thermoplastic polyester elastomer unit and a low melting-point polymer segment (b) mainly made of an aliphatic polyether unit and/or an aliphatic thermoplastic polyester elastomer unit as main components.

Among thermoplastic elastomers, a polyester block copolymer (polyester elastomer) including a crystalline aromatic polyester unit as the hard segment and an aliphatic polyether unit such as poly(alkylene oxide) glycol and/or an aliphatic polyester unit such as polylactone as the soft segment has excellent low-temperature and high-temperature properties and has rigidity of relatively low temperature dependency.

The bulk density of the polyester thermoplastic elastomer is preferably 1.01 to 1.60 g/cm$^3$ and is more preferably 1.05 to 1.20 g/cm$^3$.

The polyester thermoplastic elastomer is preferably used in terms of the decreased temperature dependency in a wide temperature range. The polyester thermoplastic elastomer includes a high melting-point crystalline polymer segment (a1) made of a crystalline aromatic polyester unit and a low melting-point polymer segment (a2) made of an aliphatic polyether unit and/or an aliphatic polyester unit as main components. The high melting-point crystalline polymer segment (a1) is a polyester mainly made of an aromatic dicarboxylic acid or its ester-forming derivative and a diol or its ester-forming derivative. Concrete examples of the aromatic dicarboxylic acid include terephthalic acid, isophthalic acid, phthalic acid, naphthalene-2,6-dicarboxylic acid, naphthalene-2,7-dicarboxylic acid, anthracene dicarboxylic acid, diphenyl-4,4'-dicarboxylic acid, diphenoxyethane dicarboxylic acid, 4,4'-diphenylether dicarboxylic acid, 5-sulfoisophathanic acid and sodium 3-sulfoisophthalate. The aromatic dicarboxylic acid is mainly used, but part of the aromatic dicarboxylic acid may be substituted as appropriate with an alicyclic dicarboxylic acid such as 1,4-cyclohexane dicarboxylic acid, cyclopentane dicarboxylic acid or 4,4'-dicyclohexyl dicarboxylic acid or with an aliphatic dicarboxylic acid such as adipic acid, succinic acid, oxalic acid, sebacic acid, dodecanedioic acid or dimer acid. Ester-forming derivatives of these dicarboxylic acids, for example, lower alkyl esters, aryl esters, carbonates and acid halides may be used similarly. Concrete examples of the diol are diols having the molecular weight of not higher than 400. For example, preferable are aliphatic diols such as 1,4-butanediol, ethylene glycol, trimethylene glycol, pentamethylene glycol, hexamethylene glycol, neopentyl glycol and decamethylene glycol and alicyclic diols such as 1,1-cyclohexanedimethanol, 1,4-dicyclohexanedimethanol and tricyclodecanedimethanol, and aromatic diols such as xylylene glycol, bis(p-hydroxy)diphenyl, bis(p-hydroxy)diphenylpropane, 2,2'-bis[4-(2-hydroxyethoxy)phenyl]propane, bis[4-(2-hydroxyethoxyl)phenyl]sulfone, 1,1-bis[4-(2-hydroxyethoxy)phenyl]cyclohexane, 4,4'-dihydroxy-p-terphenyl and 4,4'-dihydroxy-p-quarterphenyl. Ester-forming derivatives of these diols, for example, acetylates and alkali metal salts may be used similarly. Two or more of these dicarboxylic acids and their derivatives or two or more of these diols and their derivatives may be used in combination. A preferable example of the high melting-point crystalline polymer segment (a1) is a poly(butylene terephthalate) unit derived from terephthalic acid and/or dimethyl terephthalate and 1,4-butanediol. A poly(butylene terephthalate) unit derived from terephthalic acid and/or dimethyl terephthalate and a poly(butylene isophthalate) unit derived from isophthalic acid and/or dimethyl isophthalate and 1,4-butanediol are also used preferably.

The low melting-point polymer segment (a2) of the polyester thermoplastic elastomer used in the invention is an aliphatic polyether and/or an aliphatic polyester. Examples of the aliphatic polyether include poly(ethylene oxide) glycol, poly(propylene oxide) glycol, poly(tetramethylene oxide) glycol, poly(hexamethylene oxide) glycol, copolymers of ethylene oxide and propylene oxide, ethylene oxide addition polymer of poly(propylene oxide) glycol and copolymer glycol of ethylene oxide and tetrahydrofuran. Examples of the aliphatic polyester include poly(ε-caprolactone), polyenantholactone, polycaprylolactone, polybutylene adipate and polyethylene adipate. Among these aliphatic polyethers and/or aliphatic polyesters, in terms of the elastic property of the resulting polyester block copolymer, preferably used are poly(tetramethylene oxide) glycol, ethylene oxide addition product of poly(propylene oxide) glycol, copolymer glycol of ethylene oxide and tetrahydrofuran, poly(ε-caprolactone), polybutylene adipate and polyethylene adipate. Among them, especially preferably used are poly(tetramethylene oxide) glycol, ethylene oxide addition product of poly(propylene oxide) glycol and copolymer glycol of ethylene oxide and tetrahydrofuran. The number-average molecular weight of the low melting-point polymer segment is preferably about 300 to 6000 in the copolymerized form. The copolymerization amount of the low melting-point polymer segment (a2) in the polyester thermoplastic elastomer used in the invention is not specifically limited but is preferably 10 to 90% by weight, more preferably 30 to 85% by weight and furthermore preferably 50 to 80% by weight. The copolymerization amount of the low melting-point polymer segment (a2) of lower than 10% by weight provides the poor flexibility and poor bending fatigue resistance. The copolymerization amount of the low melting-point polymer segment (a2) of higher than 90% by weight, on the other hand, provides insufficient mechanical properties, insufficient high-temperature properties, insufficient oil resistance and insufficient chemical resistance.

The polyester thermoplastic elastomer used in the invention may be produced by any known method. Available methods include a method of polycondensing a reaction product by transesterification of a lower alcohol diester of dicarboxylic acid, an excess of low molecular-weight glycol and a low melting-point polymer segment component in the presence of a catalyst and a method of polycondensing a reaction product by esterification of a dicarboxylic acid, an excess of glycol and a low melting-point polymer segment component in the presence of a catalyst.

Any of the above block copolymers may be used alone or a mixture of two or more of the above block copolymers may be used.

Additionally, a mixture including a non-elastomer component or a copolymer including a non-elastomer component may also be used in the invention.

It is preferable that the mixture of the polyethylene thermoplastic resin and the polyethylene thermoplastic elastomer is a mixture of an ethylene/α-olefin copolymer resin, which is mainly made of ethylene and an α-olefin containing 3 or more carbon atoms, and the polyethylene thermoplastic elastomer, and a content of the polyethylene thermoplastic elastomer in the mixture is not higher than 45% in weight ratio. The content of the polyethylene thermoplastic elastomer in the mixture that exceeds 45% in weight ratio makes the hysteresis loss high, which undesirably causes difficulty in rolling over.

It is preferable that the polyethylene thermoplastic elastomer used in the structure of the invention is a thermoplastic elastomer which finely disperses ethylene-propylene rubber (EPDM, EPM) or a thermoplastic elastomer that includes two kinds of polyolefin formed alternatively like a block in one molecule by two kinds of catalysts.

The bulk density of the polyethylene thermoplastic elastomer is preferably in the range of 0.92 $g/cm^3$ and 0.85 $g/cm^3$, and more preferably in the range of 0.95 $g/cm^3$ and 0.81 $g/cm^3$. Since an end portion of the structure is damaged during high-temperature washing, it is preferable to reinforce a certain area of products as necessary by increasing the bulk density of the area.

The melting point of the polyethylene is preferably 60° C. to 120° C. The melting point of the thermoplastic elastomer is preferably 140° C. or higher to maintain the heat durability and is more preferably 160° C. or higher to improve the heat durability with regard to polyester elastomer. An antioxidant, a light-resistant agent or the like may be added as appropriate to improve the durability. Increasing the molecular weight of the thermoplastic resin is also effective to improve the heat durability and the permanent set resistance.

In the structure of the invention, the melt flow rate (hereinafter referred to as MFR) of the polyethylene resin is 3.0 to 35 g/10 min, MFR of the polyester thermoplastic elastomer is 3.0 to 45 g/10 min, and MFR of the mixture of the polyethylene thermoplastic resin and the polyethylene thermoplastic elastomer is 6 to 35 g/10 min.

The following describes a measurement method and a measurement apparatus of the filament diameter decrease rate of the polyethylene resin. Capilograph 1D (manufactured by Toyo Seiki Seisaku-Sho, Ltd.) is used for the measurement apparatus of the filament diameter decrease rate. The raw material resin is extruded at an extrusion rate of 3 g/10 min by applying downward a pressure to a capillary having an inner diameter $D_1$ of 1.0 mm $\phi$ and a length of 10 mm at temperature of 190° C. The filaments of the extruded raw material resin are cooled down by an alcohol. $D_2$ represents a diameter of the filament cut at a cross section. The filament diameter decrease rate is calculated as $D_2/D_1$. The filament diameter decrease rate is measured at each shear rate of the raw material resin.

A measurement method and a measurement apparatus of the filament diameter decrease rate of the polyester thermoplastic elastomer are similar to those described above, except that the temperature is changed to 210° C.

A measurement method and a measurement apparatus of the filament diameter decrease rate of the mixture resin of the polyethylene resin and the polyethylene thermoplastic elastomer are similar to those described above, except that the temperature is changed to 190° C.

The filament diameter decrease rate of the polyethylene resin used in the invention is preferably 0.93 to 1.16 at the shear rate of 24.3 sec$^{-1}$, 1.00 to 1.20 at the shear rate of 60.8 sec$^{-1}$, 1.06 to 1.23 at the shear rate of 121.6 sec$^{-1}$, 1.11 to 1.30 at the shear rate of 243.2 sec$^{-1}$, 1.15 to 1.34 at the shear rate of 608.0 sec$^{-1}$ and 1.16 to 1.38 at the shear rate of 1216 sec$^{-1}$.

The filament diameter decrease rate of the polyester thermoplastic elastomer used in the invention is preferably 1.10 to 1.38 at the shear rate of 60.8 sec$^{-1}$, 1.12 to 1.39 at the shear rate of 121.6 sec$^{-1}$, 1.15 to 1.42 at the shear rate of 243.2 sec$^{-1}$, 1.17 to 1.43 at the shear rate of 608.0 sec$^{-1}$ and 1.19 to 1.47 at the shear rate of 1216 sec$^{-1}$.

The filament diameter decrease rate of the mixture of the polyethylene resin and the polyethylene thermoplastic elastomer used in the invention is preferably 1.02 to 1.25 at the shear rate of 60.8 sec$^{-1}$, 1.11 to 1.30 at the shear rate of 121.6 sec$^{-1}$, 1.15 to 1.35 at the shear rate of 243.2 sec$^{-1}$, 1.20 to 1.40 at the shear rate of 608.0 sec$^{-1}$ and 1.23 to 1.45 at the shear rate of 1216 sec$^{-1}$.

The continuous filaments forming the structure of the invention may be combined with another thermoplastic resin to a composite form in such a range that does not adversely affect the object of the invention. The composite form may be composite of filaments.

The structured composite may be, for example, a sandwich-structure of elastomer layer/non-elastomer layer/elastomer layer, a two-layered structure of elastomer layer/non-elastomer layer and a composite structure in which a non-elastomer layer is placed partly in a center part in an elastomer layer of a matrix. Examples include a laminate of the structure made of the polyethylene and the structure made of the polyester elastomer, a laminate of the structures made of polyester elastomer and the above laminates having a cover (with or without air permeability).

The structure of the invention may be any adequately selected and multi-layered to satisfy the required performances among various structures, for example, those having different sizes of loops, those having different filament diameters, those having different compositions and those having different densities. Bonding or non-bonding of the cushion is designed according to the application and the relationship to the cover. In the case of the multi-layered structure, the structure made of a resin including elastomer component may be placed as a surface layer to increase heat resistance of the surface layer and prevent heat transfer to the inner layer. The result is that the whole multi-layered structure has preferably increased heat resistant property. A plurality of extruding machines may be used to produce the composite or multi-layered structure.

The structure of the invention may be multi-layered and integrated with wadding layer made of side fabric, cotton, urethane, or non-woven fabric by bonding with heat or ultrasonic wave. Here, cotton and non-woven fabric are preferable for high durability. Preferably, the non-woven fabric is made by bonding fibers with a binder fiber, or has a straight-shaped support structure.

The following describes one exemplary method of manufacturing the three-dimensional striped structure of the embodiment, but this manufacturing method is not restrictive. As described in, for example, JP 2001-328153A, a raw material including polyethylene, a polyester thermoplastic elastomer, a mixture of a polyethylene resin and a polyethylene thermoplastic elastomer as the main component is molten at a melt temperature that is higher than the melting point of the main component by 10° C. to 20° C. The molten raw material is fed into the die. Under application of a pressure, a plurality of filaments are ejected from a plurality of extrusion holes of the nozzle at the lower end to form a filament assembly according to the array of the plurality of extrusion holes and free-fall.

The internal temperature range of the die may be set to 100 to 400° C., and the extrusion rate may be set to 20 to 200 Kg/hour. The internal pressure of the die may be based on, for example, the ejection pressure of a 75 mm screw and ranges about 0.2 to 25 MPa.

The diameter of the hole of the nozzle in the die corresponds to filament diameter of the filaments of the structure and is preferably 0.2 to 4.0 mm and more preferably 0.4 to 1.8 mm.

The filaments in the molten state are received by at least a pair of left and right chutes (WO 2012/157289A) to which water or heated water is supplied and come into contact with one another to be fused, form a three-dimensional structure and reach the water surface. The loop diameter and the filament diameter of the filaments are determined according to the angle of chutes, the flow of supplied water, the diameter of the extrusion holes, the distances between the nozzle surface, chutes and haul-off conveyors, the melt viscosity of the resin, the diameter and the ejection rate of the extrusion holes. The filament diameter (diameter) is 0.1 to 1.8 mm, and the average diameter (length) of random loops is 5 mm to 50 mm.

The filaments of the filament assembly located on the peripheral longitudinal side faces come into contact with inclined planes of a pair of longitudinal chutes on which water flows. This configuration disturbs the vertically falling trajectory, and the filaments are tangled with adjacent filaments in loops and are slid down on the inclined planes with the flow of water or heated water supplied from a supply pipes. The filaments directly receive the effect of gravity and are tangled along the inclined planes to form loops. A pair of short-length chutes may be provided. An integrally formed chute may be provided.

The water supply ports are provided in the supply pipes that are arranged in the longitudinal direction above the respective longitudinal chutes to supply water or heated water in a temperature range of 10 to 90° C. or preferably 40 to 60° C. to the respective inclined planes. The supply pipes are connected with an upstream water supply source. The heated water may be supplied to the short-length chutes by adjusting the water flows from the supply pipes. A similar supply pipe may be additionally provided above the respective short-length chutes.

The filaments of the filament assembly that do not come into contact with either of the inclined planes of the chutes but fall down pass through the molding opening. The filaments that pass through the vicinity of the lower sides of the inclined planes among the filaments passing through the molding opening come into contact with the filaments slid down on the inclined planes to be tangled in loops. The filaments fall, while disturbance of the falling trajectory by the contact tangling is propagated to adjacent filaments in the center direction in a certain range. The filaments that pass through the center of the molding opening among the filaments passing through the molding opening reach the water surface. The haul-off speed of haul-off machines is lower than the falling speed of the filament assembly. The respective filaments reaching the water surface are bent and are tangled in loops in the vicinity of the water surface. The speed of the haul-off machines is preferably 5 to 40 m/hour. The haul-off machines haul off the filament assembly with endless belts having a caterpillar structure. The embodiment is not limited to the structure but may use other structures including rollers. The haul off machines may form loops of the filaments without using the chutes.

The structure is then hauled off with the pair of the haul-off machines at a haul-off speed that is lower than the falling speed of the assembly and falls down while being cooled in a water tank. The structure is put in an interval that is smaller than the short length of the molding opening and is subjected to a supplemental compression effect. Since the filament assembly is not completely cooled and solidified when the assembly falls down to the location of the endless belts while being submerged in water, the filament assembly is subjected to the compression molding effect by holding the assembly between the haul-off machines. When the filament assembly is hauled off and passed out, the assembly in the molten state is cooled and solidified in water, and the final shape of the assembly is fixed. The assembly is then drawn out from the water tank by holding the assembly with the rollers.

The water level of the water tank is preferably equal to or higher than the height of the lower ends of the inclined planes of the chutes. The water level is set irrespective of the height at which the chutes are placed but is set based on the lower ends of the inclined planes. Part of the haul-off machines may be exposed above the water. The water level is preferably set to 0 to 45 mm from the lower end of the inclined planes, and more preferably set to 1 to 30 mm, and most preferably set to 3 to 22 mm. The water level may be equal to the height of the lower ends of the inclined surfaces. The invention can be implemented at the water level of or above this height. Depending on the production conditions, setting the water level to be higher than the lower ends of the inclined surfaces by 3 mm or more generally prevents the water level from being located below the lower ends of the inclined surfaces. Depending on the production conditions, setting the water level to be higher than the lower ends of the inclined surfaces by 45 mm or more is, on the other hand, generally inadequate due to the start of solidification of the resin, the poor adhesion of the fibers and the increased surface roughness.

The structure having the cross section in the similar shape to that of the molding opening is drained and is conveyed by rollers to a drying heat treatment tank to be subjected to drying heat treatment with the hot air for annealing. It is preferable to set different haul-off speeds of rollers downstream and upstream of the drying heat treatment tank. For example, the haul-off speed of the rollers placed near to the outlet of the drying heat treatment tank is set to be lower than the haul-off speed of the rollers placed near to the inlet of the drying heat treatment tank. After the drying heat treatment, the structure is cut into a desired length. The structure may alternatively be cut into a desired length prior to the drying heat treatment.

The structure taken out of the water tank and drained is subjected to drying heat treatment and annealing at a drying temperature for a predetermined time duration. In the case of a low-density polyethylene, the drying temperature is preferably not higher than the melting point of the low-density polyethylene and is more preferably lower than the melting point by 10 to 70° C. In the case of a polyester thermoplastic elastomer, the drying temperature is preferably not higher than the melting point of the polyester thermoplastic elastomer and is more preferably lower than the melting point by 10 to 70° C. In the case of a mixture of a polyethylene thermoplastic resin and a polyethylene thermoplastic elastomer, the drying temperature is preferably not higher than the melting point of the mixture and is more preferably lower than the melting point by 10 to 30° C.

The annealing process may place the structure taken out of the water tank and drained in a frame in the compressed state, perform heat treatment with the hot air and then release the frame from the structure. In the case of a low-density polyethylene, the drying temperature of such annealing is preferably not higher than the melting point of the low-density polyethylene and is more preferably lower than the melting point by 10 to 70° C. In the case of a thermoplastic elastomer, the drying temperature is preferably not higher than the melting point of the thermoplastic elastomer and is more preferably lower than the melting point by 10 to 70° C. In the case of a mixture of a polyethylene thermoplastic resin and a polyethylene thermoplastic elastomer, the drying temperature is preferably not higher than the melting point of the mixture and is more preferably lower than the melting point by 10 to 70° C.

As described above, annealing may be performed in a post process (hereinafter referred to as supplementary annealing) after shape-forming of the structure in the water tank. Annealing may be performed supplementarily during production (hereinafter referred to as during-production annealing) by supplying the heated water to the water tank.

The during-production annealing is preferably performed at a temperature that is lower than the melting point of the polyethylene thermoplastic rein or the melting point of the polyester thermoplastic elastomer by at least 10 to 70° C. In the case of a mixture of a polyethylene resin and a polyethylene thermoplastic elastomer, the temperature is preferably lower than the melting point by 10 to 70° C.

The during-production annealing may supply heated water in the range of 20 to 90° C. (preferably in the range of 20 to 80° C. or more preferably in the range of 25 to 50° C.) to at least one pair of chutes, instead of supplying water of ordinary temperature to the chutes, so as to thermally weld the filaments at random and form random loops while performing annealing. The temperature of heated water is preferably 25 to 50° C. for the low-density polyethylene, is 25 to 70° C. for the thermoplastic elastomer, and is 25 to 60° C. for the mixture of the polyethylene resin and the polyethylene thermoplastic elastomer. The heated water may be supplied, for example, by (A) heating water flowed to the chutes, (B) heating the entire water tank, (C) increasing the internal temperature of the chutes formed in a tank-like shape or a combination thereof. The excessively high temperature of the heated water supplied to the chutes is likely to cause the resin to adhere to the chutes. It is thus desirable to control the heated water to an adequate temperature range, for example, 10 to 60° C. The supplementary annealing soaks the structure taken out of the water tank in heated water or causes the structure to pass through the hot air.

The annealing may be single annealing of either supplementary annealing by drying heat treatment or during-production annealing with the heated water in the water tank or the like, may be two-step annealing of supplementary annealing after during-production annealing, or may be two-step annealing of supplementary annealing performed twice. In the last case, the temperature of second supplementary annealing is set to be higher than the temperature of first annealing.

The structure of the invention manufactured by the above manufacturing method has the softness, high resilience, and the thermal expansion properties in both the longitudinal direction and the lateral direction. The thermal expansion properties differ in the longitudinal direction and in the lateral direction. According to the analysis of the inventors, the mechanism to provide the elastic properties and the thermal expansion properties or more specifically the anisotropic thermal expansion rates is complicated and is not fully elucidated. It is, however, basically thought that the characteristic variations and fluctuations of the thickness of the filaments differ the forms of tangling in the longitudinal direction and in the lateral direction in the process of free-fall, tangling and cooling of the filaments by adequately controlling the filament diameter decrease rate of the raw material in the adequate range, the melt viscosity, the MFR, extrusion molding from the holes of the nozzle, loop-forming of the filaments, cooling of the filament, supplementary annealing by drying heat treatment, and during-production annealing.

The structure has the thermal expansion properties in the lateral direction and the longitudinal direction according to the filament diameter decrease rate of the raw material, the diameter of the holes of the nozzle, the haul-off speed of the conveyors and annealing as the factors.

Chemicals may be added to the structure of the invention in a certain range that does not deteriorate the performances in any stage from production of resin to production of a molded product to provide various functions such as deodorizing, antibacterial, odor-eliminating, mildew-proofing, coloring, fragrance, flame retardant, incombustible, moisture-absorbing or moisture-desorbing functions.

The invention is described more specifically with reference to an example. The invention is, however, not limited to the example. The following methods were employed in the example for measurement and evaluation of characteristic values.

(1) Filament Diameter (mm)

Resin filaments were cut from a center portion of each sample. The thicknesses of the resin filaments were measured five times with a caliper, and the average of five measurement values was specified as the filament diameter with regard to S1 and S2. The filament diameter of an elastomer sample was estimated from the result of measurement of a polyester sample. The temperature was set to 60° C. with annealing and set to 23° C. without annealing.

(2) Sample Thickness and Bulk Density (g/cm$^3$)

Each sample was cut in the size of 30 cm×30 cm. After being left under no load for 24 hours, the height of the same was measured at four different positions. The average of the four measured values was specified as the sample thickness. The volume of the sample was calculated from the sample thickness, and the bulk density of the sample was calculated by dividing the weight of the sample by the volume.

(3) Average Diameter (mm) of Random Loops

Each sample was cut in the size of 20 cm×20 cm. With regard to random loops in irregular shapes formed on the surface in the extruding direction, the lengths of the major axes of ten loops were measured. The average value was rounded down to the centimeter and was specified as the average diameter of random loops.

(4) Hardness (N)

Each sample was cut in the size of 30 cm (in length)×30 cm (in width). The test piece was measured in conformity with JIS K 6400-2: 2012 method A. The test temperature was 20° C., and the humidity was 65%.

(5) Impact Resilience (cm)

Each sample was cut in the size of 30 cm (in length)×30 cm (in width). The test piece was measured in conformity with JIS K 6400-3: 2011. A steel ball of 41.5 mm in diameter and 290 g in weight was used. The drop height was 500 mm. The test temperature was 23° C., and the humidity was 50%.

(6) Impact Resilience Change Rate (%) After Repeated Load Test

Each sample was cut in the size of 30 cm (in length)×30 cm (in width), and an impact resilience (a) of the sample before a repeated load test was measured by the method described in (5). After measurement of the impact resilience, the sample was subjected to a repeated load compression test. The repeated load compression test was performed in conformity with the repeated compressive residual stress test method A (fixed loading method) of JIS K6400-4. The repeated load compression test was performed at the temperature of 23±2° C. and the relative humidity of 50±5%. The method A (fixed loading method) uses a pressure plate of 25 cm in diameter and repeatedly compresses a sample under a load of 750 N±20 N 80000 times at a rate of 70±5 times per minute. A time duration when the maximum load 750±20 N is applied is set to be not longer than 25% of a time duration required for repeated compression. After completion of the test, the sample was left under no load for 100±0.5 minutes. An impact resilience (b) after the repeated load test was measured by the method described in (5). An impact resilience change rate (%) after the repeated load test was calculated according to the following equation by dividing the impact resilience after the repeated load test by the impact resilience before the repeated load test:

$$\text{(impact resilience change rate (\%) after repeated load test} = (1-(b)/(a))\times 100$$

(7) Compression Deflection (%)

Each sample was cut in the size of 30 cm (in length)×30 cm (in width). The test piece was measured in conformity with JIS K 6400-2: 2012 method E. The test temperature was 23° C., and the humidity was 50%.

(8) Hysteresis Loss (%)

Each sample was cut in the size of 30 cm (in length)×30 cm (in width). The test piece was measured in conformity with JIS K 6400-2: 2012 method E.

(9) Thermal Expansion Rate (%) Before and After Hot-Air Drying Test

Each sample was cut in the size of 30 cm (in length)×30 cm (in width). Marking was made at two positions away from each other by 25 cm in the longitudinal direction and two positions away from each other by 25 cm in the lateral direction of the test piece. The marking was made with a pen to be readily recognizable even after the dry heating process.

After the marking, the test piece was placed in a hot air drying oven for 30 minutes. The test piece was then taken out of the hot air drying oven and was cooled down at ambient temperature of 22° C. for 30 minutes. After cooling, the marking distances were measured at two different positions in each of the longitudinal direction and the lateral direction. The average values of the respective two positions were specified as longitudinal length after the test and lateral length after the test. A measuring instrument capable of measuring down to 0.01 cm was used for measurement of all the lengths. The thermal expansion rate before and after the hot-air drying test was calculated by (25−measured length)/25×100. The temperature of the hot-air drying test was set to 90° C. for the polyethylene resin, was 130° C. for the polyester thermoplastic elastomer and was 90° C. for the mixture of the polyethylene resin and the polyethylene thermoplastic elastomer.

(10) Tensile Strength (N)

Each sample was cut in the size of 20 cm (in length)×5 cm (in width). The test piece was fastened to a jig with fixing brackets placed across a distance of 10 cm. The tension rate was 10 cm/min. The room temperature during measurement was 20° C., and the humidity was 65%. A jig for fixation was used for the thermoplastic elastomer having a certain thickness. Each sample was measured twice in each of the longitudinal direction and the lateral direction. The maximum point load was specified as the measurement value.

EXAMPLES

Example 1

The conditions employed were as follows: the screw diameter of an extrusion machine was 65 mm; the temperature of a die was 205° C.; the die had the width of 890 mm and the thickness of 75 mm; the hole pitch was 10 mm; the nozzle hole diameter was 1.6 mm; and the air gap (distance between the lower surface of the nozzle and the water level) was 67 mm. Hexane, hexene and ethylene as main raw materials were polymerized by a known method using a metallocene compound as the catalyst. An obtained ethylene/α-olefin copolymer had the filament diameter decrease rate of 1.05 at the shear rate of 24.3 $sec^{-1}$, 1.12 at the shear rate of 60.8 $sec^{-1}$, 1.15 at the shear rate of 121.6 $sec^{-1}$, 1.18 at the shear rate of 243.2 $sec^{-1}$, 1.23 at the shear rate of 608.0 $sec^{-1}$ and 1.26 at the shear rate of 1216 $sec^{-1}$, the MFR of 12 g/10 min and the density of 0.90 g/$cm^3$. Filaments of the ethylene/α-olefin copolymer were ejected downward from a nozzle at the extrusion rate of 86 kg/h at the melt temperature of 180° C. The lower ends of chutes were placed 36 mm below the nozzle surface and were submerged in water. A pair of stainless steel haul-off conveyors of 105 cm in width were placed parallel to each other across an opening width of 71 mm to be arranged partly above the water surface. The ejected filaments in the molten state were solidified on the chutes with supply of water heated to 36° C. The filaments were brought in contact with one another and were tangled to form loops, while being fused at the points of contact, so as to form a three-dimensional striped structure. The respective surfaces of the structure in the molten state were placed between the haul-off conveyors and were hauled off into warm water of 36° C. at the haul-off rate of 6.7 mm/sec to be solidified and flattened. The structure was cut into a predetermined size and was subjected to annealing by dry heating process with the hot air of 60° C. for 5 minutes. The resulting structure was formed in a rectangular sectional shape from filaments of 0.6 to 1.1 mm in diameter and had the flattened surfaces, the bulk specific gravity of 53 kg/$m^3$, the thickness of 75 mm, the width of 890 mm, the thermal expansion rates of 2.31% in the lateral direction and 1.52% in the longitudinal direction before and after the hot-air drying test at 90° C. for 30 minutes, the hysteresis loss of 28.7%, the impact resilience of 31 cm and the impact resilience change rate of 0% after the repeated load test. The temperature was 19° C., and the humidity was 42%.

Example 2

The conditions employed were as follows: the screw diameter of an extrusion machine was 40 mm; the temperature of a die was 190° C.; the die had the width of 500 mm and the thickness of 25 mm; the hole pitch was 10 mm; the nozzle hole diameter was 1.6 mm; and the air gap (distance between the lower surface of the nozzle and the water level) was 38 mm. Filaments of an ethylene/α-olefin copolymer (produced from the same raw materials as those of Example 1) and polyethylene were ejected downward from a nozzle at the extrusion rate of 13 kg/h at the melt temperature of 160° C. The lower ends of chutes were placed 36 mm below the nozzle surface and were submerged in water. A pair of stainless steel haul-off conveyors of 55 cm in width were placed parallel to each other across an opening width of 23 mm to be arranged partly above the water surface. The ejected filaments in the molten state were solidified on the chutes with supply of water heated to 36° C. The filaments were brought in contact with one another and were tangled to form loops, while being fused at the points of contact, so as to form a three-dimensional striped structure. The respective surfaces of the structure in the molten state were placed between the haul-off conveyors and were hauled off into warm water of 36° C. at the haul-off rate of 4.1 mm/sec to be solidified and flattened. The structure was cut into a predetermined size and was subjected to annealing by dry heating process with the hot air of 60° C. for 5 minutes. The resulting structure was formed in a rectangular sectional shape from filaments of 0.6 to 1.1 mm in diameter and had the flattened surfaces, the bulk specific gravity of 70 kg/$m^3$, the thickness of 25 mm, the width of 500 mm, the thermal expansion rates of 1.87% in the lateral direction and 1.39% in the longitudinal direction before and after the hot-air drying test at 90° C. for 30 minutes, the hysteresis loss of 28.6%, the impact resilience of 33 cm and the impact resilience change rate of 6.1% after the repeated load test. The temperature was 21° C., and the humidity was 48%.

Example 3

The conditions employed were as follows: the screw diameter of an extrusion machine was 65 mm; the temperature of a die was 217° C.; the die had the width of 900 mm and the thickness of 30 mm; the hole pitch was 10 mm; the nozzle hole diameter was 1 mm; and the air gap (distance between the lower surface of the nozzle and the water level) was 69 mm. A thermoplastic elastomer (Hytrel®) had the filament diameter decrease rate of 1.26 at the shear rate of 60.8 $sec^{-1}$, 1.28 at the shear rate of 121.6 $sec^{-1}$, 1.30 at the shear rate of 243.2 $sec^{-1}$, 1.30 at the shear rate of 608.0 $sec^{-1}$ and 1.33 at the shear rate of 1216 $sec^{-1}$, the MFR of 14 g/10 min and the density of 1.08 g/$cm^3$. Filaments of the thermoplastic elastomer were ejected downward from a nozzle at the extrusion rate of 27.5 kg/h at the melt temperature of 195° C. The lower ends of chutes were placed 69 mm below the nozzle surface and were submerged in water. A pair of stainless steel haul-off conveyors of 105 cm in width were placed parallel to each other across an opening width of 70 mm to be arranged partly above the water surface. The ejected filaments in the molten state were solidified on the chutes with supply of water heated to 63° C. The filaments were brought in contact with one another and were tangled to form loops, while being fused at the points of contact, so as to form a three-dimensional striped structure. The respective surfaces of the structure in the molten state were placed between the haul-off conveyors, were hauled off at the haul-off rate of 3.9 mm/sec to be solidified and flattened, and were annealed with hot water of 80° C. The structure was cut into a predetermined size and was subjected to annealing by dry heating process with the hot air of 130° C. for 5 minutes. The resulting structure was formed in a rectangular sectional shape from filaments of 0.5 to 1.0 mm in diameter and had the flattened surfaces, the bulk specific gravity of 71 kg/m$^3$, the thickness of 30 mm, the width of 900 mm, the thermal expansion rates of 0.78% in the lateral direction and 1.70% in the longitudinal direction before and after the hot-air drying test at 130° C. for 30 minutes, the hysteresis loss of 17.1%, the impact resilience of 33 cm and the impact resilience change rate of 0% after the repeated load test. The temperature was 33° C., and the humidity was 48%.

Example 4

The conditions employed were as follows: the screw diameter of an extrusion machine was 65 mm; the temperature of a die was 225° C.; the die had the width of 900 mm and the thickness of 73 mm; the hole pitch was 10 mm; the nozzle hole diameter was 1.6 mm; and the air gap (distance between the lower surface of the nozzle and the water level) was 69 mm. Filaments of a thermoplastic elastomer (Hytrel®) (the same raw material as that of Example 3) were ejected downward from a nozzle at the extrusion rate of 40 kg/h at the melt temperature of 202° C. The lower ends of chutes were placed 69 mm below the nozzle surface and were submerged in water. A pair of stainless steel haul-off conveyors of 105 cm in width were placed parallel to each other across an opening width of 72 mm to be arranged partly above the water surface. The ejected filaments in the molten state were solidified on the chutes with supply of water heated to 63° C. The filaments were brought in contact with one another and were tangled to form loops, while being fused at the points of contact, so as to form a three-dimensional striped structure. The respective surfaces of the structure in the molten state were placed between the haul-off conveyors, were hauled off at the haul-off rate of 2.7 mm/sec to be solidified and flattened, and were annealed with hot water of 80° C. The structure was cut into a predetermined size and was subjected to annealing by dry heating process with the hot air of 130° C. for 5 minutes. The resulting structure was formed in a rectangular sectional shape from filaments of 0.5 to 1.2 mm in diameter and had the flattened surfaces, the bulk specific gravity of 63 kg/m$^3$, the thickness of 73 mm, the thermal expansion rates of 1.22% in the longitudinal direction and 3.08% in the lateral direction before and after the hot-air drying test, the hysteresis loss of 16.7%, the impact resilience of 34 cm and the impact resilience change rate of 5.9% after the repeated load test. The temperature was 30° C., and the humidity was 44%.

Example 5

The conditions employed were as follows: the screw diameter of an extrusion machine was 40 mm; the temperature of a die was 195° C.; the die had the width of 500 mm and the thickness of 51 mm; the hole pitch was 10 mm; the nozzle hole diameter was 1 mm; and the air gap (distance between the lower surface of the nozzle and the water level) was 38 mm. Filaments of a mixture including an ethylene/α-olefin copolymer (produced from the same raw materials as those of Example 1) as the main component and an incombustible material were ejected downward from a nozzle at the extrusion rate of 23 kg/h at the melt temperature of 160° C. The lower ends of chutes were placed 38 mm below the nozzle surface and were submerged in water. A pair of stainless steel haul-off conveyors of 55 cm in width were placed parallel to each other across an opening width of 40 mm to be arranged partly above the water surface. The ejected filaments in the molten state were solidified on the chutes with supply of water heated to 36° C. The filaments were brought in contact with one another and were tangled to form loops, while being fused at the points of contact, so as to form a three-dimensional striped structure. The respective surfaces of the structure in the molten state were placed between the haul-off conveyors and were hauled off into warm water of 36° C. at the haul-off rate of 6.8 mm/sec to be solidified and flattened. The structure was cut into a predetermined size and was subjected to dry heating process with the hot air of 60° C. for 5 minutes. This provided a three-dimensional striped structure having the bulk density of 45 kg/m$^3$. The resulting structure was formed in a rectangular sectional shape from filaments of 0.7 to 1.3 mm in diameter and had the flattened surfaces, the bulk specific gravity of 50 kg/m$^3$, the thickness of 51 mm, the width of 400 mm, the thermal expansion rates of 2.68% in the longitudinal direction and 1.28% in the lateral direction before and after the hot-air drying test at 90° C. for 30 minutes, the hysteresis loss of 27.0%, the impact resilience of 24 cm and the impact resilience change rate of 16.7% after the repeated load test. The temperature was 15° C., and the humidity was 52%.

Example 6

The conditions employed were as follows: the screw diameter of an extrusion machine was 40 mm; the temperature of a die was 195° C.; the die had the width of 500 mm and the thickness of 25 mm; the hole pitch was 10 mm; the nozzle hole diameter was 1 mm; and the air gap (distance between the lower surface of the nozzle and the water level) was 38 mm. Hexane, hexene and ethylene as main raw materials were polymerized by a known method using a metallocene compound as the catalyst. Filaments of a mixture including the resulting ethylene/α-olefin copolymer (produced from the same raw materials as those of Example 1) as the main component and an incombustible material were ejected downward from a nozzle at the extrusion rate of 17 kg/h at the melt temperature of 160° C. The lower ends of chutes were placed 36 mm below the nozzle surface and were submerged in water. A pair of stainless steel haul-off conveyors of 55 cm in width were placed parallel to each other across an opening width of 40 mm to be arranged partly above the water surface. The ejected filaments in the molten state were solidified on the chutes with supply of water heated to 36° C. The filaments were brought in contact with one another and were tangled to form loops, while being fused at the points of contact, so as to form a three-dimensional striped structure. The respective surfaces of the structure in the molten state were placed between the haul-off conveyors and were hauled off into warm water of 36° C. at the haul-off rate of 4.5 mm/sec to be solidified and flattened. The structure was cut into a predetermined size and was subjected to dry heating process with the hot air of 60° C. for 5 minutes. This provided a three-dimensional striped structure having the bulk density of 65 kg/m³. The resulting structure was formed in a rectangular sectional shape from filaments of 0.7 to 1.3 mm in diameter and had the flattened surfaces, the bulk specific gravity of 50 kg/m³, the thickness of 43 mm, the width of 400 mm, the thermal expansion rates of 2.06% in the longitudinal direction and 1.22% in the lateral direction before and after the hot-air drying test at 90° C. for 30 minutes, the hysteresis loss of 30.0%, the impact resilience of 32 cm and the impact resilience change rate of 12.5% after the repeated load test. The temperature was 21° C., and the humidity was 48%.

Example 7

The conditions employed were as follows: the screw diameter of an extrusion machine was 40 mm; the temperature of a die was 205° C.; the die had the width of 500 mm and the thickness of 60 mm; the hole pitch was 10 mm; the nozzle hole diameter was 1 mm; and the air gap (distance between the lower surface of the nozzle and the water level) was 38 mm. Hexane, hexene and ethylene as main raw materials were polymerized by a known method using a metallocene compound as the catalyst. Filaments of a mixture including the resulting ethylene/α-olefin copolymer (produced from the same raw materials as those of Example 1) and 20% by weight of an olefin block copolymer (polyethylene thermoplastic elastomer) were ejected downward from a nozzle at the extrusion rate of 22 kg/h at the melt temperature of 200° C. The lower ends of chutes were placed 39 mm below the nozzle surface and were submerged in water. A pair of stainless steel haul-off conveyors of 55 cm in width were placed parallel to each other across an opening width of 40 mm to be arranged partly above the water surface. The ejected filaments in the molten state were solidified on the chutes with supply of water heated to 29° C. The filaments were brought in contact with one another and were tangled to form loops, while being fused at the points of contact, so as to form a three-dimensional striped structure. The respective surfaces of the structure in the molten state were placed between the haul-off conveyors and were hauled off into warm water of 29° C. at the haul-off rate of 4.5 mm/sec to be solidified and flattened. The structure was cut into a predetermined size and was subjected to dry heating process with the hot air of 60° C. for 5 minutes. This provided a three-dimensional striped structure having the bulk density of 65 kg/m³. The resulting structure was formed in a rectangular sectional shape from filaments of 0.8 to 1.5 mm in diameter and had the flattened surfaces, the bulk specific gravity of 65 kg/m³, the thickness of 50 mm, the width of 405 mm, the thermal expansion rates of 3.04% in the longitudinal direction and 2.72% in the lateral direction before and after the hot-air drying test at 90° C. for 30 minutes, the hysteresis loss of 29.1%, the impact resilience of 16 cm and the impact resilience change rate of 5.5% after the repeated load test. The temperature was 12° C., and the humidity was 45%.

Comparative Example 1

A net-like structure of a polyester thermoplastic elastomer used for a mattress manufactured by another company (thickness of 45 mm and width of 400 mm) was examined by the above respective tests. The net-like structure had the bulk specific gravity of 40 kg/m³, the thermal expansion rates of −0.32% (contracted) in the longitudinal direction and −0.12% (contracted) in the lateral direction before and after the hot-air drying test at 130° C. for 30 minutes, the hysteresis loss of 70.4%, the impact resilience of 22 cm and the impact resilience change rate of 68.2% after the repeated load test.

Comparative Example 2

A net-like structure of a polyester thermoplastic elastomer used for a mattress that is different from Comparative Example 1 and manufactured by another company (thickness of 25 mm and width of 400 mm) was examined by the above respective tests. The net-like structure had the bulk specific gravity of 50 kg/m³, the thermal expansion rates of −0.28% (contracted) in the longitudinal direction and −0.20% (contracted) in the lateral direction before and after the hot-air drying test at 130° C. for 30 minutes, the hysteresis loss of 81.0%, the impact resilience of 21 cm and the impact resilience change rate of 4.8% after the repeated load test.

As mentioned above, the invention provides the thermal expansion characteristic in the longitudinal direction and in the lateral direction and thereby, in an application of a mattress, suppress shrinkage the mattress and wrinkles of the cover even in the case of high-temperature sterilization, as well as bedsore due to wrinkles. The invention also provides the anisotropic thermal expansion characteristic having different thermal expansion rates in the longitudinal direction and in the lateral direction. This enables the structure to be fit for its application and the characteristics of the human body in the application.

Additionally, the invention provides the low hysteresis loss, the softness and high repulsion characteristic and thereby provides the elastic property fit for the characteristics of the human body. This accordingly meets a diversity of needs for the elastic properties of products and needs for the high quality of products.

The invention may be used for cushions, Japanese floor cushions and cushions for handicapped people as well as materials for mattresses and mattresses. It is feasible to multilayer a polyethylene and a thermoplastic polyester elastomer.

The invention is not limited to the above embodiments but various modifications, changes and additions may be made to the embodiments without departing from the scope of the invention. Such modifications as well as their equivalents are also included in the scope of the invention.

TABLE 1

|  | Example 1 | Example 2 | Example 3 | Example 4 | Example 5 | Example 6 | Example 7 | Comparative Example 1 | Comparative Example 2 |
|---|---|---|---|---|---|---|---|---|---|
| Screw diameter (mm) | 65 | 40 | 65 | 65 | 40 | 40 | 40 |  |  |
| Die temperature (° C.) | 205 | 190 | 217 | 225 | 195 | 195 | 205 |  |  |

TABLE 1-continued

| | Example 1 | Example 2 | Example 3 | Example 4 | Example 5 | Example 6 | Example 7 | Comparative Example 1 | Comparative Example 2 |
|---|---|---|---|---|---|---|---|---|---|
| Nozzle hole diameter (mm) | 1.6 | 1.6 | 1 | 1.6 | 1 | 1 | 1 | | |
| Air gap (mm) | 67 | 38 | 69 | 69 | 38 | 38 | 38 | | |
| Extruding amount (kg/h) | 86 | 13 | 27.5 | 40 | 23 | 23 | 22 | | |
| Cooling water temperature (° C.) | 36 | 36 | 63 | 63 | 36 | 36 | 29 | | |
| Haul-off speed (mm/sec) | 6.7 | 4.1 | 3.9 | 2.7 | 6.8 | 4.5 | 4.5 | | |
| Annealing (° C.) | 60 | 60 | 90 | 90 | 60 | 60 | 60 | | |
| Bulk specific gravity (kg/m$^3$) | 53 | 70 | 71 | 63 | 45 | 65 | 65 | 40 | 50 |
| Thickness (mm) | 75 | 25 | 30 | 73 | 51 | 52 | 50 | 45 | 25 |
| Thermal expansion rate Longitudinal direction (extruding direction) (%) | 2.31 | 1.87 | 0.78 | 1.22 | 2.68 | 2.06 | 3.04 | −0.32 | −0.28 |
| Thermal expansion rate Lateral direction (%) | 1.52 | 1.39 | 1.70 | 3.08 | 1.28 | 1.22 | 2.72 | −0.12 | −0.20 |
| Impact resilience (cm) | 31 | 33 | 33 | 34 | 24 | 32 | 16 | 22 | 21 |
| Impact resilience change rate after a repeated load test (%) | 0.0 | 6.1 | 0.0 | 5.9 | 16.7 | 12.5 | 5.5 | 68.2 | 4.8 |
| Hysteresis loss (%) | 28.7 | 28.6 | 17.1 | 16.7 | 27.0 | 30.0 | 29.1 | 70.4 | 81.0 |
| Temperature (° C.) | 19 | 21 | 33 | 30 | 15 | 15 | 12 | 23 | 23 |
| Humidity (%) | 42 | 48 | 48 | 44 | 52 | 52 | 45 | 50 | 50 |
| Width (mm) | 890 | 500 | 900 | 900 | 400 | 400 | 405 | 400 | 400 |

INDUSTRIAL APPLICABILITY

The invention provides vehicle seats, cushions, mattresses, covers and the like having low hysteresis loss, the softness and high repulsion characteristic, the thermal expansion characteristic where the structure heat expands in the longitudinal direction and in the lateral direction by a hot-air drying test, and different thermal expansion characteristic in the longitudinal direction and in the lateral direction to provide the elastic property fit for health consciousness. In particular, the invention provides cushions that are soft and easy to stretch in the longitudinal direction, which is suitable for care of bedsores and nursing care purposes. Additionally, the invention is applicable to vehicle seats, cushions used for beds, mats and the like or covers for seats.

The invention claimed is:

1. A three-dimensional striped structure that is formed by bonding continuous filaments partly at random in loops,
the three-dimensional striped structure has a longitudinal direction corresponding to an extrusion direction, a lateral direction and a thickness direction perpendicular to the extrusion direction and is comprised of a polyethylene thermoplastic resin, a polyester thermoplastic elastomer or a mixture of a polyethylene thermoplastic resin and a polyethylene thermoplastic elastomer, wherein
the three-dimensional striped structure has an impact resilience of not lower than 13 cm, a hysteresis loss of not higher than 34% and not lower than 13%, and a thermal expansion rate of 0 to 8% in the longitudinal direction before and after a hot-air drying test that is performed at a temperature of 90° C. for 30 minutes with regard to the polyethylene thermoplastic resin, that is performed at a temperature of 130° C. for 30 minutes with regard to the polyester thermoplastic elastomer and that is performed at a temperature of 90° C. for 30 minutes with regard to the mixture of the polyethylene thermoplastic resin and the polyethylene thermoplastic elastomer.

2. The three-dimensional striped structure according to claim 1, wherein the three-dimensional striped structure has a thermal expansion rate of 0 to 8% in the lateral direction before and after the hot-air drying test that is performed at the temperature of 90° C. for 30 minutes with regard to the polyethylene thermoplastic resin, that is performed at the temperature of 130° C. for 30 minutes with regard to the polyester thermoplastic elastomer and that is performed at the temperature of 90° C. for 30 minutes with regard to the mixture of the polyethylene thermoplastic resin and the polyethylene thermoplastic elastomer.

3. The three-dimensional striped structure according to claim 1, wherein the three-dimensional striped structure has an anisotropic thermal expansion characteristic providing different thermal expansion rates in the longitudinal direction and in the lateral direction.

4. The three-dimensional striped structure according to claim 1, wherein the three-dimensional striped structure has an impact resilience change rate of not higher than 25% with regard to the polyethylene thermoplastic resin after a repeated load test, and not higher than 20% with regard to the polyester thermoplastic elastomer after a repeated load test.

5. The three-dimensional striped structure according to claim 1, wherein the three-dimensional striped structure has an apparent density of 0.025 g/cm$^3$ to 0.2 g/cm$^3$, a thickness of 5 mm to 500 mm in each layer and a filament diameter of 0.1 mm to 1.5 mm.

6. The three-dimensional striped structure according to claim 1, wherein the polyethylene thermoplastic resin is selected from polyethylene or an ethylene/α-olefin copolymer resin that is mainly made of ethylene and an α-olefin containing 3 or more carbon atoms.

7. The three-dimensional striped structure according to claim 1, wherein the mixture of the polyethylene thermoplastic resin and the polyethylene thermoplastic elastomer is a mixture of an ethylene/α-olefin copolymer resin, which is mainly made of ethylene and an α-olefin containing 3 or more carbon atoms, and the polyethylene thermoplastic elastomer; and a content of the polyethylene thermoplastic elastomer in the mixture is not higher than 45% in weight ratio.

8. The three-dimensional striped structure according to claim 1, wherein the three-dimensional striped structure is used for cushions, cushion seats, Japanese floor cushions, pillows, nursing care products, or cushions or mattress for beds.

9. The three-dimensional striped structure according to claim 1, wherein the three-dimensional striped structure has a plurality of surfaces, among which two surfaces, three surfaces or four surfaces are molded or a curved surface is molded.

10. The three-dimensional striped structure according to claim 1, wherein the three-dimensional striped structure has a multi-layer structure of a three-dimensional net-like structure made of polyethylene thermoplastic resin and a three-dimensional net-like structure made of polyethylene thermoplastic elastomer.

11. The three-dimensional striped structure according to claim 10, wherein the three-dimensional net-like structure has stripe sparse and dense portions arranged alternately in an extruding direction, the ratio of the number of bonding points of the dense portion to that of the sparse portion per unit weight is 0.96 to 1.33, and the apparent density of the dense portion is larger than the apparent density of the sparse portion by not less than 0.005 $g/cm^3$.

* * * * *